J. BRADLEY & J. NICHOLAS.
Machines for Thrashing and Hulling Clover.
No. 138,556. Patented May 6, 1873.
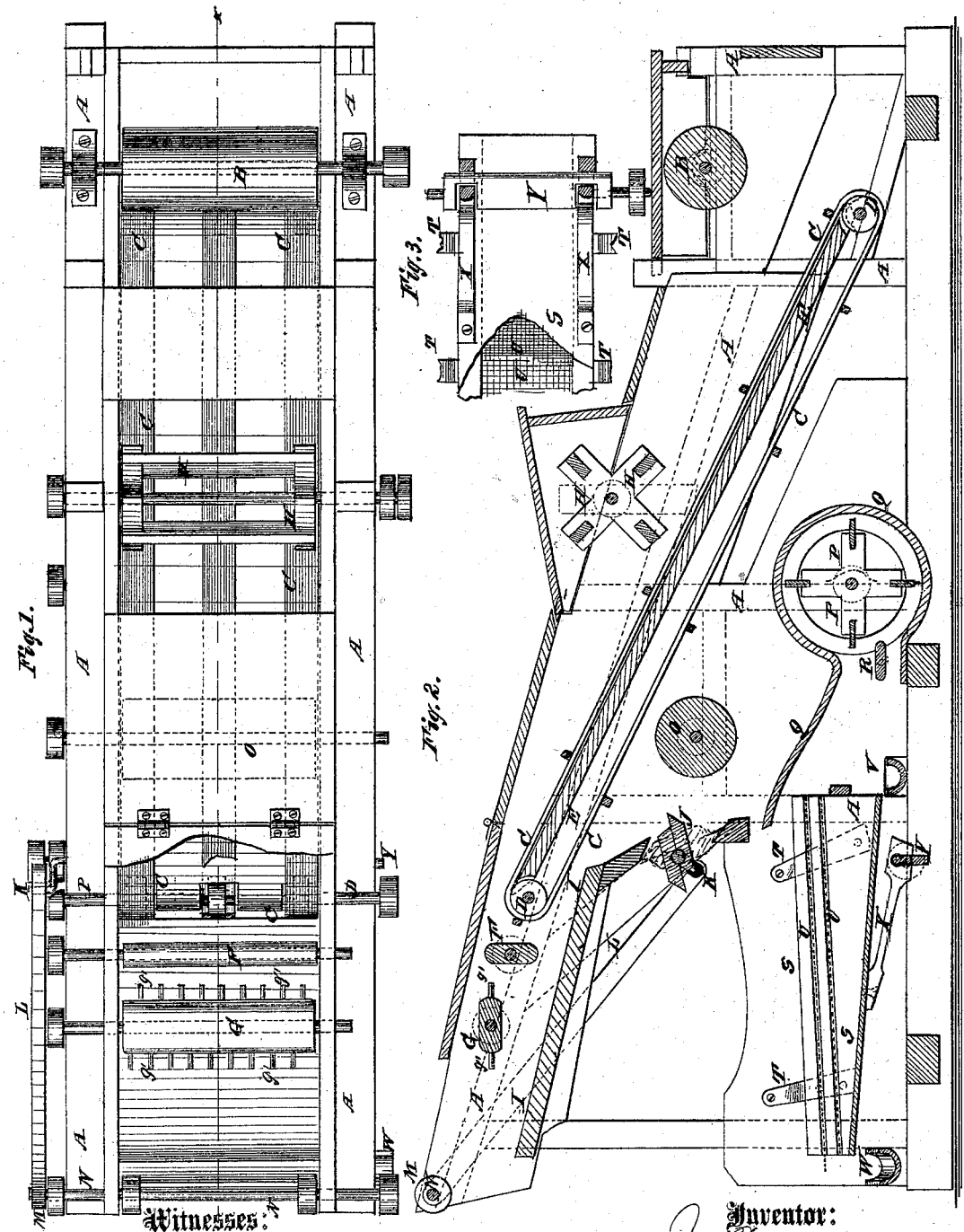

UNITED STATES PATENT OFFICE.

JAMES BRADLEY AND JAMES NICHOLAS, OF GOMER, OHIO.

IMPROVEMENT IN MACHINES FOR THRASHING AND HULLING CLOVER.

Specification forming part of Letters Patent No. 138,556, dated May 6, 1873; application filed February 1, 1873.

*To all whom it may concern:*

Be it known that we, JAMES BRADLEY and JAMES NICHOLAS, of Gomer, in the county of Allen and State of Ohio, have invented a new and useful Improvement in Combined Thrasher, Grain-Separator, and Clover-Huller, of which the following is a specification:

Figure 1 is a top view of our improved machine, parts being broken away to show the construction. Fig. 2 is a detail vertical longitudinal section of the same taken through the line $x$ $x$, Fig. 1. Fig. 3 is a detail view of the under side of the shoe, parts being broken away to show the construction.

Similar letters of reference indicate corresponding parts.

Our invention has for its object to improve the construction of the machine for which Letters Patent No. 66,765 were issued to Isaac N. Young July 16, 1867, so as to make it more effective in operation, and adapt it for use with grain or clover, as may be desired, doing its work thoroughly in either capacity.

The special feature of our invention is the mode of arranging and connecting the feed-board with other parts.

A represents the frame-work of the machine, and B an ordinary thrashing-cylinder, from which the grain and clover pass to the endless carrier C that is arranged to pass around a stationary inclined table E. The straw or hay is taken from the carrier by the pickers F G, and transferred to the straw-carrier, which carrier, with the exception of its driving-roller, is not shown in the drawing. H is a beater, which is placed over the middle part of the carrier C to beat the straw or hay, and thus knock out the grain or seed. The grain or seed from the upper end of the table E and carrier C, and that knocked out by the pickers F G, falls upon and slides down the inclined table I. The lower part of the table I is made with a steeper inclination, the middle part of said steeper inclined part being cut away and replaced by the feed-board J. The ends of the feed-board J are pivoted to the frame-work of the machine so that when the machine is used for thrashing and cleaning grain the said feed-board may be turned into an inclined position with respect to the plane of the steeper part of the table I to guide the grain to the screens of the shoe. To one of the journals of the feed-board J is attached a crank, K, to which is pivoted the lower end of the connecting-rod L, the upper end of which is pivoted to the crank M attached to the journal of the straw-carrier roller N. The crank M is made shorter than the crank K so that the revolutions of the crank M may only oscillate the crank K, and thus agitate the feed-board J to prevent the grain from lodging upon said feed-board.

When the machine is used for thrashing and cleaning clover-seed the connecting-rod L is disconnected, and the feed-board J is adjusted into the plane of the lower and more steeply-inclined part of the table I so as to form a part of said inclined part, and thus guide the clover balls and seed to the hulling-cylinder O.

P P are the blast-fans, inclosed by a case, Q. R is a board for controlling the direction of the blast. S is the shoe having screens U, and hung from the frame-work or casing of the machine by pivoted bars T. V W are spouts for carrying off the seed. The spring-bars X connect the shoe with the crank-shaft or bar Y.

Having thus described our invention, we claim as new and desire to secure by Letters Patent—

The combination of the crank K, connecting-rod L, and crank M with the feed-board J and with the roller N of the straw-carrier, substantially as herein shown and described.

JAMES BRADLEY.
       JAMES NICHOLAS.

Witnesses:
 SAMUEL LIGHT,
 A. J. MILL.